United States Patent
Tanimoto

(10) Patent No.: US 6,885,469 B1
(45) Date of Patent: Apr. 26, 2005

(54) IMAGE PROCESSING DEVICE

(75) Inventor: Yoshifumi Tanimoto, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1066 days.

(21) Appl. No.: 09/585,088

(22) Filed: Jun. 1, 2000

(30) Foreign Application Priority Data

Jun. 17, 1999 (JP) .......................................... 11-171706

(51) Int. Cl.[7] .......................... G06F 15/00; G06F 13/00
(52) U.S. Cl. .................... 358/1.14; 358/1.15; 358/437; 714/43; 714/44; 399/18; 710/15; 710/16; 710/17; 710/18; 710/19
(58) Field of Search .............................. 358/1.14, 1.15, 358/437; 714/43, 44; 399/18; 710/15–19

(56) References Cited

U.S. PATENT DOCUMENTS

| | | | | |
|---|---|---|---|---|
| 5,760,927 A | * | 6/1998 | Sakai et al. .................. | 358/501 |
| 5,872,641 A | * | 2/1999 | Ozeki et al. ................. | 358/434 |
| 5,886,793 A | * | 3/1999 | Satou .......................... | 358/404 |
| 6,211,966 B1 | * | 4/2001 | Osada et al. ................ | 358/1.13 |
| 6,351,316 B1 | * | 2/2002 | Saito et al. ................. | 358/1.15 |
| 6,665,425 B1 | * | 12/2003 | Sampath et al. ............. | 382/112 |

FOREIGN PATENT DOCUMENTS

| JP | 06-315029 | 11/1994 |
|---|---|---|
| JP | 10-032664 | 2/1998 |

* cited by examiner

Primary Examiner—Edward Coles
Assistant Examiner—Alan Rahimi
(74) Attorney, Agent, or Firm—Hogan & Hartson, LLP

(57) ABSTRACT

An image processing device detects errors within its functions, and reports these errors to a client device. The client device then instructs the image processing device to disable problem functions, while allowing functions that are properly working to still be used.

17 Claims, 3 Drawing Sheets

IMAGE PROCESSING DEVICE

BACKGROUND OF THE INVENTION

1. Field of the Invention

The present invention relates to an image processing device, such as a LAN-connected facsimile server, whose functions and operations can be monitored by LAN clients, and relates particularly to an image processing device that allows the LAN clients to selectively disable functions of the device after malfunctioning of the device is detected.

2. Description of the Related Art

Recently, image processing devices have been developed for use with Local Area Networks ("LANs"). One such image processing device is a fax server that acts as "gateway" device, allowing facsimile messages to be transmitted between LAN-connected client computers ("clients") and remote facsimile machines connected over the PSTN (the "Publicly Switched Telephone Networks").

Such a facsimile server may monitor scanning, transmission, or other functions that it performs. If and when an error is detected in one of the functions, an error message is either displayed on a display unit at the fax server or at a network client.

When an error is detected in such a prior art fax server, however, the entire fax server is disabled, thereby preventing a user from utilizing other functions of the device that may be functioning properly. For example, if the device is a multi-function copier/fax server, an error in the transmission function of the device prohibits users from utilizing the copy function.

SUMMARY OF THE INVENTION

It is thus an object of the present invention to provide an image processing device that monitors its own functions, reports detected errors to an external device such as LAN client, and allows the external device to selectively disable individual functions of the image processing device without disabling other functions that are working properly.

In order to accomplish this object, according to a first aspect of the present invention, an image processing device includes a detecting mechanism that detects errors in the functions performed by the device, a transmission unit that transmits the detection results of the detecting mechanism to a second device, and a disabling mechanism that selectively disables one or more of the functions of the image processing device based on instructions given by the second device. Errors detected by the image processing device are sent to the second device (a network client, for example), and the malfunctioning portion(s) of the image processing device can be selectively disabled by instructions sent from the second device. Thus, not only are network clients notified of problems with the image processing device, but only those functions that behave improperly are disabled. Functions that work properly can still be utilized, and the usefulness of the device is greatly improved. In other words, "function reduction" is realized. It should be noted, of course, that although the image processing device of the present invention disclosed in the detailed description section of the present specification is described as embodied as a facsimile server, other embodiments are possible, including other facsimile-type devices, and network scanners having communication capability.

The image processing device may further include a reception unit that receives data from a remote device, a printing unit that prints the data received by the reception unit, and a forwarding unit that forwards the data received by the reception unit to the second device. If an error is detected in the printing unit, the data received by the reception unit is forwarded to the second device along with a message indicating to the second device that there is an error in the printing unit.

The image processing device may further include a connection unit that connects to a plurality of communication lines or networks, and the disabling mechanism may disable connection to a communication line/network on which the irregularity detection mechanism has detected an irregularity. Since use of one of the plurality of communication lines/networks is only prohibited when the detection unit detects an error in that communication line/network, the error in only one of the communication lines to which the image processing device is connected would not shut off the entire functions of the device. The plurality of communication lines/networks may be PSTN and LAN, and the image processing device may be a fax server. Alternatively, the plurality of communication lines/networks may be two or more PSTNs.

DETAILED DESCRIPTION OF THE INVENTION

The preferred embodiment of the present invention will now be described in detail with reference to the accompanying drawings.

Figure 1:
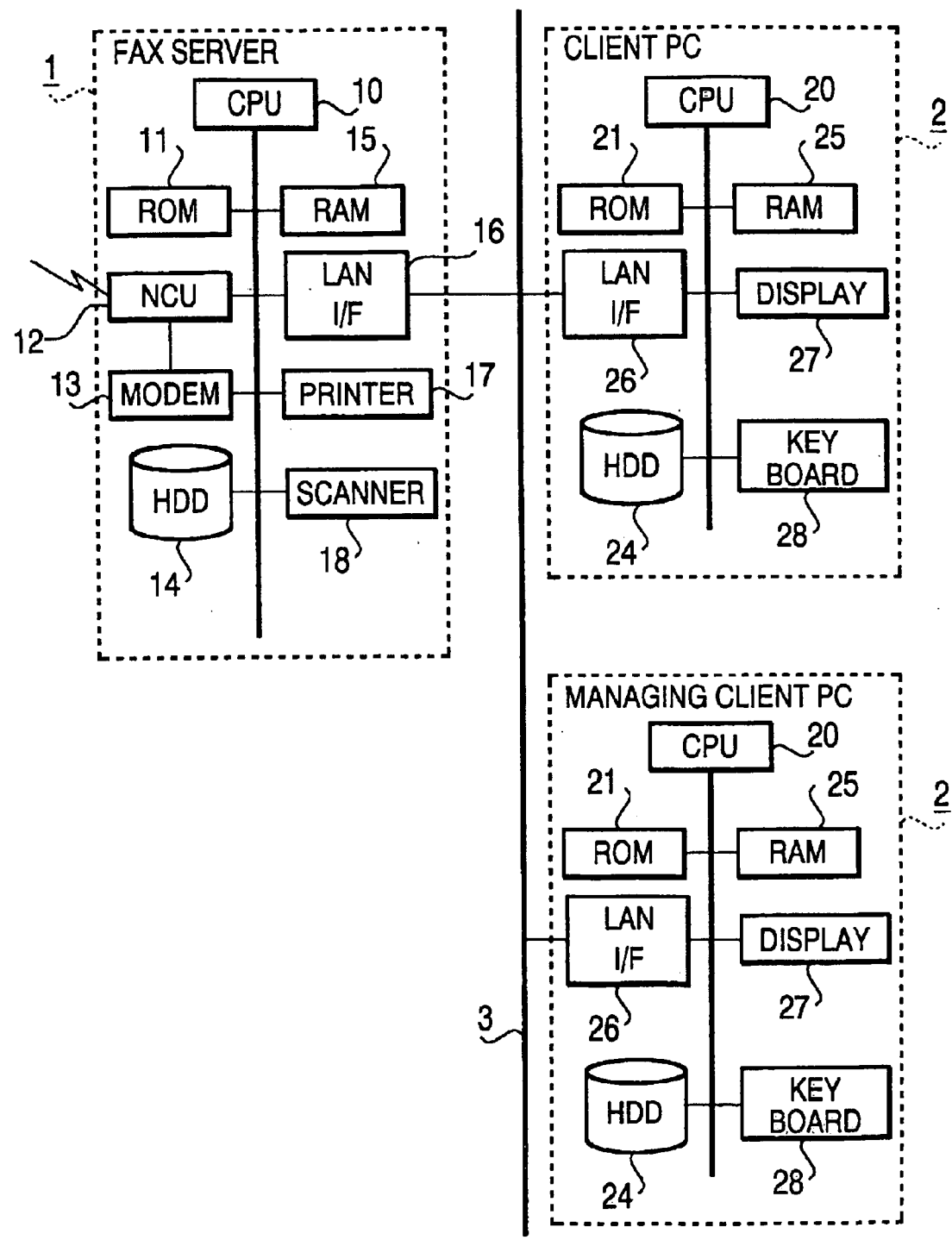
FIG. 1 is a block diagram showing an image processing machine of the present invention practiced in a facsimile server.

Referring to FIG. 1, illustrated is a block diagram of an image processing device 1 of the present invention embodied as a fax server. The facsimile server 1 includes a CPU 10, ROM 11, NCU 12, modem 13, hard disk drive (HDD) 14, RAM 15, LAN interface unit (LAN I/F) 16, printer 17, and scanner 18.

CPU 10 controls the various hardware elements of the fax server 1 based on programs stored in ROM 11. For example, the CPU 10 controls the modem 13, codes and decodes document image data to and from MH, MR, and MMR encoding schemes, and executes facsimile communication programs.

Additionally, the CPU 10 detects irregularities in the hardware elements, and in the event that an irregularity is detected, transmits this fact to one of clients 2 that is provided for management of the fax server 1 (referred to as "management client"; will be described). Instructions from this management client 2 disable affected function(s) of the fax server 1 and/or cause the fax server 1 to perform alternative operations.

ROM 11 stores various pre-loaded programs required to operate the fax server 1.

The modem 13 is a fax and data modem connected over the BUS, and is capable of performing both facsimile and Internet communication. The modem 13 is directly connected to NCU (Network Control Unit) 12. The NCU 12 is controlled by the pre-loaded programs to establish and terminate connections over the analog publicly switched telephone network (PSTN), and serves to connect the modem 13 with the PSTN when necessary. Although only one modem 13 and NCU 12 are shown in FIG. 1, it should be understood that a plurality of modems and NCU's 13, 12 can be provided for connection to a plurality of lines.

DSU (Digital Service Unit) may optionally be provided in order to connect a digital ISDN line. It should again be noted that the machine may connect to both ISDN and PSTN lines.

The hard disk drive 14 is used to store data (such as sub-addresses, user IDs, passwords, and the like) about the network clients 2, and may also be used instead of ROM 11 to store programs that run the fax server 1.

RAM 15 may be S-RAM or D-RAM, and temporarily stores data generated during execution of the control programs, as well as image data and messages that have been received or are to be transmitted by the fax server 1. It should be further noted that the data stored in the hard disk 14 may alternatively be stored in the RAM 15.

The LAN I/F 16 is used to connect the fax server 1 to a node of the LAN 3.

The printer 17 may be an electro-photographic or similar printing device. It may print document image data and the like stored in RAM 15, as well as data stored in the hard disk 14. The printer 17 is also provided with an internal error detection sensor (a low-toner detection or paper-jam detection sensor, for example). When the internal error detection sensor detects an error, data indicating an irregularity is output to CPU 10.

The scanner 18 scans a document/image using a CCD or similar scanning device, and outputs the resulting document image data. As with the printer 17, the scanner 18 is provided with an internal detection sensor (a paper-jam detection sensor, for example), and when an error is detected, data indicating the irregularity is output to CPU 10.

It should be noted that input devices (a keyboard, mouse, etc.), display units (LCD, CRT, etc.), or touch screen input devices may also be arranged in the fax server 1.

Each of the clients 2 includes a personal computer or the like, that is basically comprised of a CPU 20, a ROM 21, a hard disk 24, a RAM 25, a LAN I/F 26, a display 27, a keyboard, 28, etc. One of the clients 2 is designed as a manager of the fax server 1.

The client CPU 20 controls the various hardware elements of its respective client 2, and executes programs stored in its ROM 21 for, among other things, displaying messages and error data received from the fax server 1, and disabling functions or specifying alternative processing to be performed by the fax server 1.

The client ROM 21 stores various pre-loaded programs needed to operate the client 2.

The client hard disk 24 may be used instead of ROM 21 to store operating programs or the like.

The client RAM 25 may be S-RAM or D-RAM, and is used to temporarily store data generated during execution of the stored programs. It may also store messages, image data, and the like either forwarded from or to be forwarded to the fax server 1.

The client LAN I/F 26 is used to connect the client 2 to a node of the LAN 3.

The client display 27 may include an LCD, CRT, or other display device, and is used to display data and the like sent from the fax server 1.

A keyboard is provided to the client 2 to serve as an input device for operating the machine. Naturally, a mouse or other instrument may be provided, as well. It should be noted that provision of a keyboard 28 can be obviated by provision of a touch-screen display unit or the like in the display unit 27.

The fax server 1 is self-monitoring; if any of its functions generate an error or malfunction, the managing client 2 is informed of the error, and the client's user is allowed to take corrective measures from the client side, either selectively disabling the problem function, or instructing that an alternative function be performed.

Figure 2:
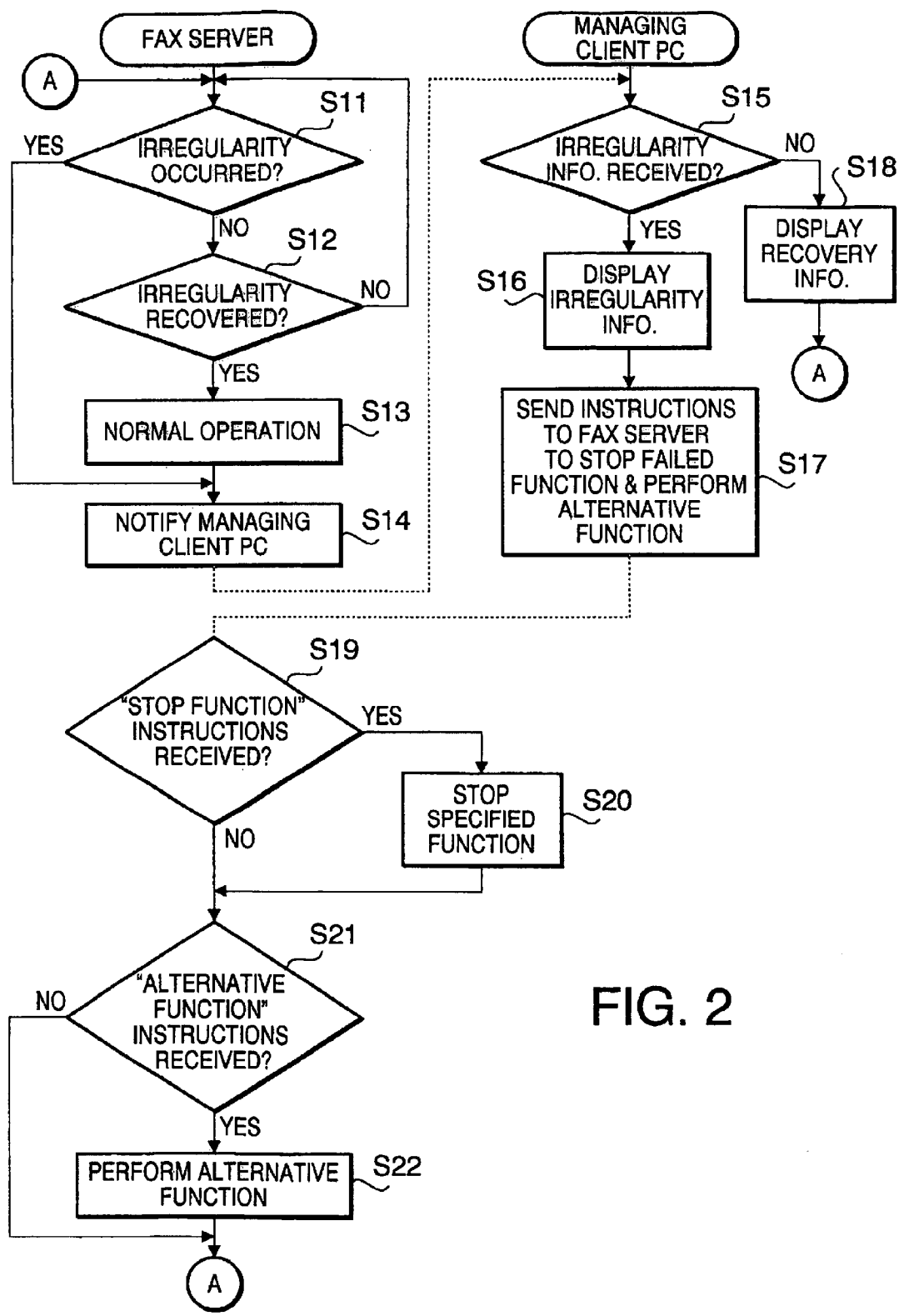
FIG. 2 is a flow chart showing an example of the processing performed by fax server CPU when local errors are detected, and the processing performed by client machine PC that manages the fax server.

Referring to the flow chart shown in FIG. 2, an example of processing performed by the fax server 1 when it finds irregularity in itself and associated processing performed by the managing client 2 will be described.

First, at step S11, the server 1 determines whether or not an error has been generated in any of the hardware elements of the machine. If an error is detected (Step S11, YES), then the managing PC 2 is notified of the error at step S14. The user (or a repair man) then examines and repairs, if possible, the area or function that generated the error (not shown in the flow chart). After that the fax server CPU 20 determines whether or not the error status of the machine has been cleared (Step S12). If the problem is not solved and the error persists, then the program returns to step S11.

Examples of problems that may be monitored (and detected) at steps S11 and S12 are no recording sheets, paper jams, low/no toner, a faulty photosensitive drum, overheating of the fuser, and problems with indicators (lamps) in the printing unit 17 and scanner 18. Of course, this list is non-exhaustive; the machine can be set to detect many different kinds of errors. These errors can be corrected between steps S11 and S12 by, for example, feeding new recording sheets, removing torn pages, clearing paper jams, replacing toner cartridges, drum units, fusers, indicators, lamps, or other faulty parts, etc.

If the error status is cleared by the user or serviceman, i.e., if that function is recovered, then the program proceeds to step S13, where the machine 1 is brought into a stand-by condition to perform jobs requested by the user. In other words, when the irregularity in a certain function of the fax server 1 is eliminated, the shut off condition of that function will automatically be cleared off. It should be noted that alternatively, the present invention may be comprised such that the error is cleared based on instructions from the managing client PC 2.

After step S13, the network client 2 (the managing PC) is notified of the recovery (Step S14). This fax server 1 may send this notification to the managing PC 2 in an interrupting manner, depending upon seriousness of the irregularity.

At step S15, the managing PC 2 determines whether or not the error status of the machine is included in the transmitted data. If the error status is present (Step S15, YES), then the program proceeds to step S16 and displays an indication (a message on the display unit 27, for example) to the user that the fax server 1 has an error. If, however, there is no error status in the transmitted data, then the program proceeds to step S18 and displays an indication to the user that an error at the fax server 1 has not occurred or has been cleared, and returns to step S11.

When the user of the client 2 sees that there is an error at the fax server 1 after step S16, he or she may choose to disable the function for which there is an error, or may instruct that alternate processing be performed instead of the problem function. The client 2 sends the user's instructions over the LAN 3 to the fax server at step S17.

Then, the fax server 1 receives the instructions sent from the client 2, and determines whether or not the instructions order the machine to disable a function (Step S19). If so (Step S19, Yes), then the fax server 1 disables the indicated function (Step S20). It should be noted that the function that is disabled here need not be a function that caused the problem, but could be any function of the fax server 1.

If the received instructions do not indicate that a function is to be disabled (Step S19, No), or after the function has been disabled (step S20), the program proceeds to step S21 where fax server 1 determines whether or not the instructions-order the machine to perform alternative processing for the problem function. If it is determined that an alternative function is to be performed (Step S21, YES), then the fax server 1 is set to perform the designated function (Step S22); otherwise (Step S21, NO) the program returns to step S11.

It should be noted that although the present embodiment has disclosed that only the managing client 2 is notified of errors at the fax server 1, it should be apparent to those skilled in the art that the other networks clients 2 can also be notified, and such that any fax server 1 functions can be enabled or disabled by any of the network clients 2.

Now, a concrete example will be described.

When the fax server 1 detects an error in the printer unit 17, the managing PC client 2 instructs the fax server 1 to perform alternative processing for the problem function. Specifically, the managing client 2 sets the fax server 1 to send received facsimile image data directly to another client PC 2 instead of printing them out at the local printer 17. It should be noted that alternatively the facsimile data may be transferred to the managing client 2.

Figure 3:
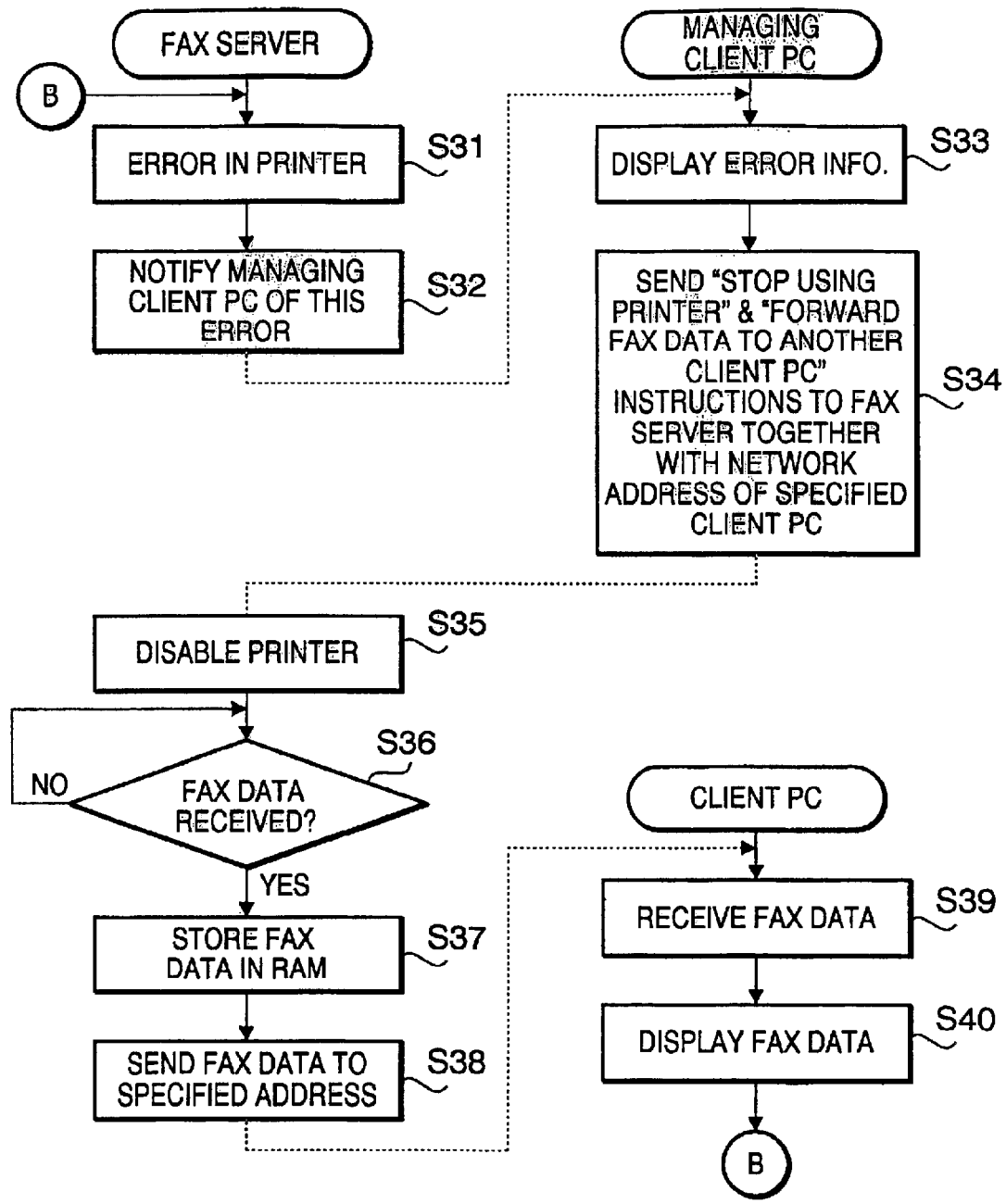
FIG. 3 is an alternate example of the processing performed by the fax server CPU when errors are detected in a printer, and the processing performed by the client machine PC.

Referring now to FIG. 3, when the fax server 1 detects a printer error (step S31), it notifies the managing client PC 2 of this fact over the LAN 3 (step S32).

The managing client PC 2 displays the error notification on its own display unit 27 (step S33). When the PC user sees this error message, the user inputs commands through the client keyboard 28 or similar input device to disable the fax printer 17, and cause the fax server 1 to perform the alternative processing if necessary. The user also sets the fax server 1 to forward received fax image data to a network address of another client 2, which the user inputs through the keyboard 28. These instructions are then sent to the fax server 1 over the LAN 3 (step S34).

When the fax server 1 receives these instructions, it disables the printer 17 (step S35), and then enters a stand-by mode awaiting reception of a facsimile message. This stand-by mode is indicated in the flowchart diagram by the loop at step S36; the fax server 1 determines periodically whether or not a facsimile data has been received. When fax data is received, it is not printed out at the printer 17, but instead is stored in RAM 15 (step S37), and the stored message is sent to the forwarding address (input by the user at step S34) over LAN 3 (step S38).

The client 2 specified by the managing client 2 then receives the forwarded fax data from the fax server 1 (step S39), and displays the image data on its display screen 27 (step S40). The program then returns to step 531.

In addition to the specific arrangement described herein to cope with the printer error, the present invention may compensate for a wide variety of errors. For example, if there is an error in the scanning unit 18 (e.g., when a lamp runs out), the invention may allow the device to be used for communication or printing. Alternatively, if there is an error in the communication function of the machine, a multifunction device could still be used as a network scanner or a printing station. Of course, if there are errors in all functions of the machine, all the functions become disabled as is the case with the prior art machines.

If the fax server 1 is connected to a plurality of communication lines, and an error persists in one of the lines, then the fax server 1 can be arranged such that it sends data specifying the problem line (the telephone number of the line, for example) along with data indicating the error. The data is sent to the managing client 2 over the LAN 3. The managing client 2 then sends data to the fax server 1 instructing it to prohibit use of that line. Then, even if the fax server 1 receives a command from other clients 2 over the LAN 3 requesting use of the line, it can respond by indicating to those clients 2 that the line cannot be used. In order to ensure that the disabled line is not requested by other network clients 2, it is preferable that the fax server 1 announce to all the network clients 2 except the managing client 2 that the communication line is disabled as soon as the line is disabled.

It should be apparent to those skilled in the art that although the present invention is embodied in a facsimile server in the foregoing description, the invention can be employed in any kind of multi-function or hybrid-type device, including, for example, a machine having a digital copying function.

The illustrated and described image processing device is disclosed in Japanese Patent Application No. 11-171706 filed on Jun. 17, 1999, the instant application claims priority of this Japanese Patent Application, and the entire disclosure thereof is herein incorporated by reference.

What is claimed is:

1. An image processing device having a plurality of functions comprising:

a detection unit that detects an error in a function among the plurality of functions of the image processing device;

a transmission unit that transmits detection result of the detection unit to an external device;

a disabling unit that prevents the function of the image processing device, of which error is detected by the detection unit, from being used in response to instructions received from the external device; and a connection unit that connects the image processing device to a plurality of communication lines, wherein the disabling unit prohibits use of at least one of the plurality of communication lines when the detection unit detects an error in said at least one of the plurality of communication lines.

2. The image processing device of claim 1 further including:

a reception unit that receives data from an external source;

a printing unit that prints out the data received by the reception unit; and a forwarding unit that forwards the data received by the reception unit to the external device when the detection unit detects an error in the printing unit.

3. The image processing device of claim 1, wherein the external device is a LAN-connected personal computer.

4. The image processing device of claim 2, wherein the external source is a remote facsimile machine, and the data received by the reception unit is facsimile data.

5. The image processing device of claim 1, wherein the plurality of communication lines includes PSTN and LAN.

6. The image processing device of claim 1, wherein the plurality of communication lines includes a plurality of PSTNs.

7. The image processing device of claim 1 further including:
   a reception unit that receives data from an external source;
   a printing unit that prints out the data received by the reception unit; and
   a forwarding unit that forwards the data received by the reception unit to a third device when the detection unit detects an error in the printing unit.

8. The image processing device of claim 7, wherein the external source is a remote facsimile machine, and the data received by the reception unit is facsimile data.

9. The image processing device of claim 7 further including a second reception unit that receives delivery information about the third device from the external device, and wherein the forwarding unit forwards the data to the third device according to the delivery information.

10. A facsimile server having a plurality of functions and connected to a plurality of client computers via a Local Area Network, the facsimile server comprising:
   a detection unit that detects an error in a function among the plurality of functions of the facsimile server;
   a transmission unit that transmits detection result of the detection unit to one of the plurality of client computers;
   a disabling unit that prevents the function of the facsimile server, of which error is detected by the detection unit, from being used in response to instructions received from the one of the plurality of client computers; and
   a connection unit that connects the facsimile server to a plurality of communication lines, wherein the disabling unit prohibits use of at least one of the plurality of communication lines when the detection unit detects an error in said at least one of the plurality of communication lines.

11. The facsimile server of claim 10 further including:
   a reception unit that receives data from a remote facsimile;
   a printing unit that prints out the data received by the reception unit; and
   a forwarding unit that forwards the data received by the reception unit to at least one of the plurality of client computers when the detection unit detects an error in the printing unit.

12. The facsimile server of claim 10, wherein the plurality of communication lines include PSTN and LAN.

13. The facsimile server of claim 10, wherein the plurality of communication lines include two or more PTSNs.

14. A method of controlling an image processing device capable of performing a plurality of functions, comprising the steps of:
   detecting an error in a function among the plurality of functions of the image processing device;
   transmitting detection result of the step A to an external device;
   preventing the function of the image processing device, of which error is detected at the step A, from being used in response to instructions received from the external device;
   connecting the image processing device to a plurality of communication lines; and
   prohibiting use of at least one of the plurality of communication lines when an error is detected in said at least one of the plurality of communication lines.

15. The method of claim 14 further including the steps of:
   receiving data from an external source;
   printing out the data received at the step D if an error is not detected in a printing function of the image processing device at the step A; and
   forwarding the data received at the step D to the external device when an error is detected in the printing function at the step A.

16. The method of claim 14, wherein the external device is a LAN-connected personal computer.

17. The method of claim 15, wherein the external source is a remote facsimile machine, and the data received at the step D is facsimile data.

* * * * *